United States Patent

Sakata et al.

[11] Patent Number: 5,206,717
[45] Date of Patent: Apr. 27, 1993

[54] IMAGE SENSING APPARATUS HAVING HORIZONTAL SHIELDING MASKS

[75] Inventors: Tsuguhide Sakata, Tokyo; Toshihiko Mimura, Kanagawa, both of Japan

[73] Assignee: Canon Kabushiki Kaisha, Tokyo, Japan

[21] Appl. No.: 789,458

[22] Filed: Nov. 7, 1991

Related U.S. Application Data

[63] Continuation of Ser. No. 652,187, Feb. 7, 1991, abandoned, which is a continuation of Ser. No. 388,682, Aug. 2, 1989, abandoned.

[30] Foreign Application Priority Data

Aug. 8, 1988 [JP] Japan ................................. 63-196028
Aug. 8, 1988 [JP] Japan ................................. 63-196029

[51] Int. Cl.$^5$ ............................................. H04N 5/335
[52] U.S. Cl. ......................................... 358/43; 358/41
[58] Field of Search ................. 358/41, 43, 44, 55, 358/213.26, 213.28

[56] References Cited

U.S. PATENT DOCUMENTS

| | | | |
|---|---|---|---|
| 3,975,760 | 8/1976 | Yamanaka et al. | 358/41 |
| 4,016,598 | 4/1977 | Yamanaka | 358/41 |
| 4,334,238 | 6/1982 | Morishita et al. | 358/43 |
| 4,642,677 | 2/1987 | Takanashi et al. | 358/43 |
| 5,003,402 | 3/1991 | Takanashi et al. | 358/41 |

FOREIGN PATENT DOCUMENTS

1-238384 9/1989 Japan.

Primary Examiner—Edward L. Coles, Sr.
Assistant Examiner—Kim Yen Vu
Attorney, Agent, or Firm—Robin, Blecker, Daley & Driscoll

[57] ABSTRACT

An image sensing apparatus comprising a photographic optical system, a splitter optical system for splitting an optical image formed by the photographic optical system into a plurality of channels to form a plurality of optical images, at least first and second image sensors for photoelectrically converting the plurality of optical images formed by the splitter optical system into electrical signals, and a drive circuit for synchronously driving the first and second image sensors, being characterized in that the first and second image sensors are arranged on optically equivalent planes in offset relation by a distance equal to ½ of a picture element in the vertical direction and an imaging plane of each of both image sensors has horizontally extending shielding masks arranged thereon of about ½ picture element wide with a pitch of one picture element in the vertical direction.

13 Claims, 6 Drawing Sheets

IMAGE SENSING APPARATUS HAVING HORIZONTAL SHIELDING MASKS

This is a continuation application under 37 CFR 1.62 of application Ser. No. 652,187, filed Feb. 7, 1991, now abandoned, which is a continuation of application Ser. No. 388,682 filed Aug. 2, 1989 now abandoned.

BACKGROUND OF THE INVENTION

1. Field of the Invention

This invention relates to an image sensing apparatus and, more particularly, to an image sensing apparatus which can obtain still images of high resolution in the vertical direction.

2. Description of the Prior Art

Many types of image sensing apparatus have been developed and commercialized for television signals. Yet, since they are designed in adaptation to the television system such as NTSC or PAL or SECAM, the resolution in the vertical direction is not high enough. In other words, the NTSC system has a field of about 480 lines in the vertical direction, and the PAL or SECAM system is of about 560 lines.

On the other hand, as the video-related technology is spreading, such a new technology that a video signal is used for printing a still picture on a sheet of paper has been proposed, where a problem arises that for a case of requiring a resolution of, for example, 16 lines/mm, the use of the conventional image sensing apparatus of the NTSC type can only realize a size of picture on the order of 3 cm in vertical length. Also, if the size is unduly enlarged, the roughness of texture of the printed picture undersirably increases.

Also, as the unified form of an image sensing apparatus with a video recorder for recording the output signals of that apparatus, there are publicly known the electronic still camera and the ½ in. VTR type movie camera. The image sensing apparatus used in these cameras, or the video camera, too, is of the type that video signals for the television system are produced.

Thus, the conventional image sensing apparatus, because of making its output or video signals conform to the television standards, is insufficient in the point of the resolution in the vertical direction and cannot be used particularly when the image quality of the obtained picture is desired to be high.

SUMMARY OF THE INVENTION

An object of the present invention is to provide an image sensing apparatus which enables picture signals of high resolution in the vertical direction to be obtained.

According to the present invention, in a first embodiment thereof, an image sensing apparatus comprises a photographic optical system, splitter means for splitting an optical image formed by the photographic optical system into two channels to form two optical images, first and second image sensing means for photoelectrically converting the two optical images formed by the splitter means into electrical signals and drive means for synchronously driving the first and second image sensing means, being characterized in that the first image sensing means and the second image sensing means are arranged in offset relation by a distance equal to one-half of a picture element in the vertical direction on an optically equivalent plane, and horizontally extending shielding masks having a width equal to about one-half of a picture element in the vertical direction with a vertical pitch equal to one picture element in the vertical direction are arranged on an imaging plane of each of the first and second image sensing means.

Also, the image sensing apparatus according to another embodiment of the invention comprises a photographic optical system, splitter means for splitting an optical image formed by the photographic optical system into three channels to form three optical images, first and second image sensing means for a luminance signal and third image sensing means for a chrominance signal for photoelectrically converting the three optical images formed by the splitter means into electrical signals, drive means for synchronously driving the first, second and third image sensing means, being characterized in that the first and second image sensing means are arranged in offset relation by a distance equal to one-half of a picture element in the vertical direction on an optically equivalent plane, and horizontally extending shielding masks having a width equal to about one-half of a picture element in the vertical direction with a vertical pitch equal to one picture element in the vertical direction are arranged on an imaging plane of each of the first and second image sensing means.

By setting forth the above-described position relationship of the first image sensing means and the second image sensing means and using the above-described horizontally extending shielding masks as in the first or second embodiment, the output of the first image sensing means and the output of the second image sensing means become complementary to each other. Therefore, by making one of these outputs to be the first field, and the other to be the second field, high-definite video signals can be obtained.

Other objects of the invention and its features will become apparent from the following written specification and drawings.

DETAILED DESCRIPTION OF THE PREFERRED EMBODIMENTS

The invention is next described in connection with embodiments thereof by reference to the drawings.

Figure 1:
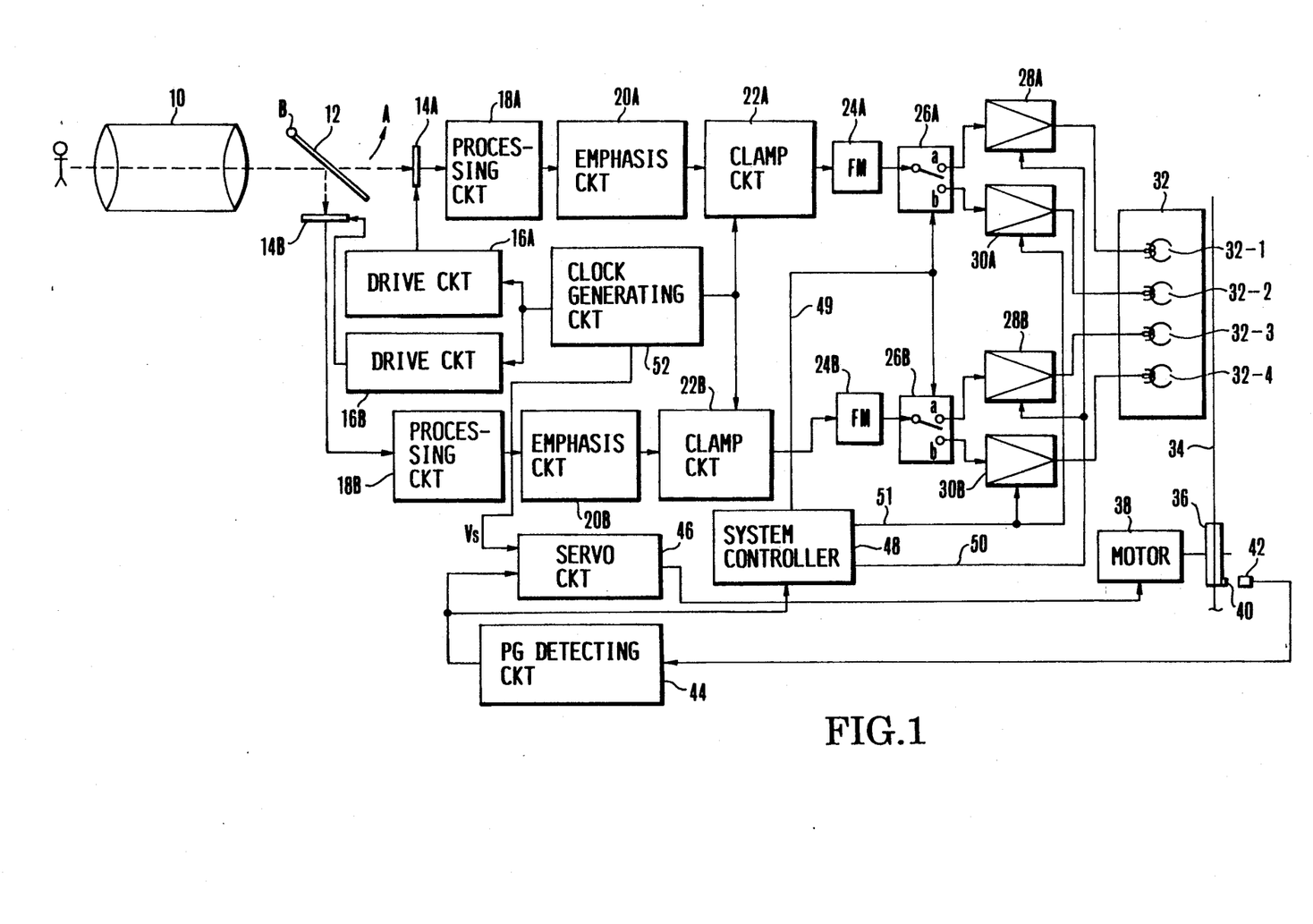
FIG. 1 is a block diagram illustrating the construction of a first embodiment of the invention applied to the picture recording apparatus.

FIG. 1 in block diagram shows one embodiment of the invention applied to the camera-unified type picture recording apparatus, where an example of the NTSC monochrome video signal is taken for the purpose of simplifying explanation. A photographic lens 10, a half-mirror 12 and a first solid-state image sensor 14A consisting of about 480 lines for producing video signals of the NTSC standards are arranged in axial alignment with each other. Similar to the first image sensor 14A, a second solid-state image sensor 14B consists of about 480 lines and produces video signals of the NTSC standards. Drive circuits 16A and 16B drive the image sensors 14A and 14B, respectively. The image sensors 14A and 14B, though will be more fully described later, are arranged on respective optically equivalent planes to each other.

In the present embodiment, the first image sensor 14A and the second image sensor 14B are associated with respective individual signal processing channels (A channel and B channel) for recording of the same structure comprising processing circuits 18A and 18B, emphasis circuits 20A and 20B, clamp circuits 22A and 22B, FM modulation circuits 24A and 24B, selection switches 26A and 26B for recording-magnetic heads, pairs of recording amplifiers 28A and 28B; 30A and 30B, and a multichannel head 32. The multichannel head 32 contains four magnetic heads 32-1, 32-2, 32-3 and 32-4.

A magnetic recording medium 34 in the form of a magnetic sheet has a center core 36. An electric motor 38 drives rotation of the magnetic sheet 34. A PG pin 40 is mounted on the center core 36 at a decentered position. A PG detecting coil 42 for detecting the PG pin 40 is connected to a PG detecting circuit 44. A servo circuit 46 controls the speed of rotation of the motor 38 to a predetermined value. A system controller 48 controls coordination of all the portions of the apparatus. A clock generating circuit 52 supplies the drive circuits 16A and 16B, the clamp circuits 22A and 22B and the servo circuit 46 with a clock that is a reference for the operations of these parts.

Next, the operation of the apparatus of FIG. 1 is described. Light coming from an object to be photographed and entering through the photographic lens 10 is split by the half-mirror 12 into two parts which form images on the respective first and second image sensors 14A and 14B. Both image sensors 14A and 14B are synchronously driven by the drive circuits 16A and 16B in accordance with the clock output from the clock generating circuit 50. Therefore, the video signals output from the two image sensors 14A and 14B are synchronized with each other. The processing circuits 18A and 18B perform gamma correction ($\gamma = 0.45$) and addition with a composite synchronizing signal, and apply the result to the emphasis circuits 20A and 20B. In the emphasis circuits 20A and 20B, the emphasis treatment known to those skilled in the art is carried out. The clamp treatment known to those skilled in the art is then carried out in the clamp circuits 22A and 22B. Then, the FM modulation circuits 24A and 24B carry out FM modulation according to, for example, still video format with the sync. tip at 6 MHz and the white peak at 7.5 MHz.

The outputs of the FM modulation circuits 24A and 24B are supplied through the switches 26A and 26B and the recording amplifiers 28A, 30A, 28B and 30B to the multichannel head 32 and recorded on the magnetic sheet 34. Changing over between the two switched positions of each of the switches 26A and 26B is controlled by a control signal 49 from the system controller 48, and transition of the recording amplifiers 28A, 30A, 28B and 30B to the operative position is controlled by record gating signals 50 and 51 from the system controller 48 so that a recording current is applied to the respective one in each pair of the heads of the multichannel head 32 and maintained to flow thereto for a predetermined time.

Figure 2:
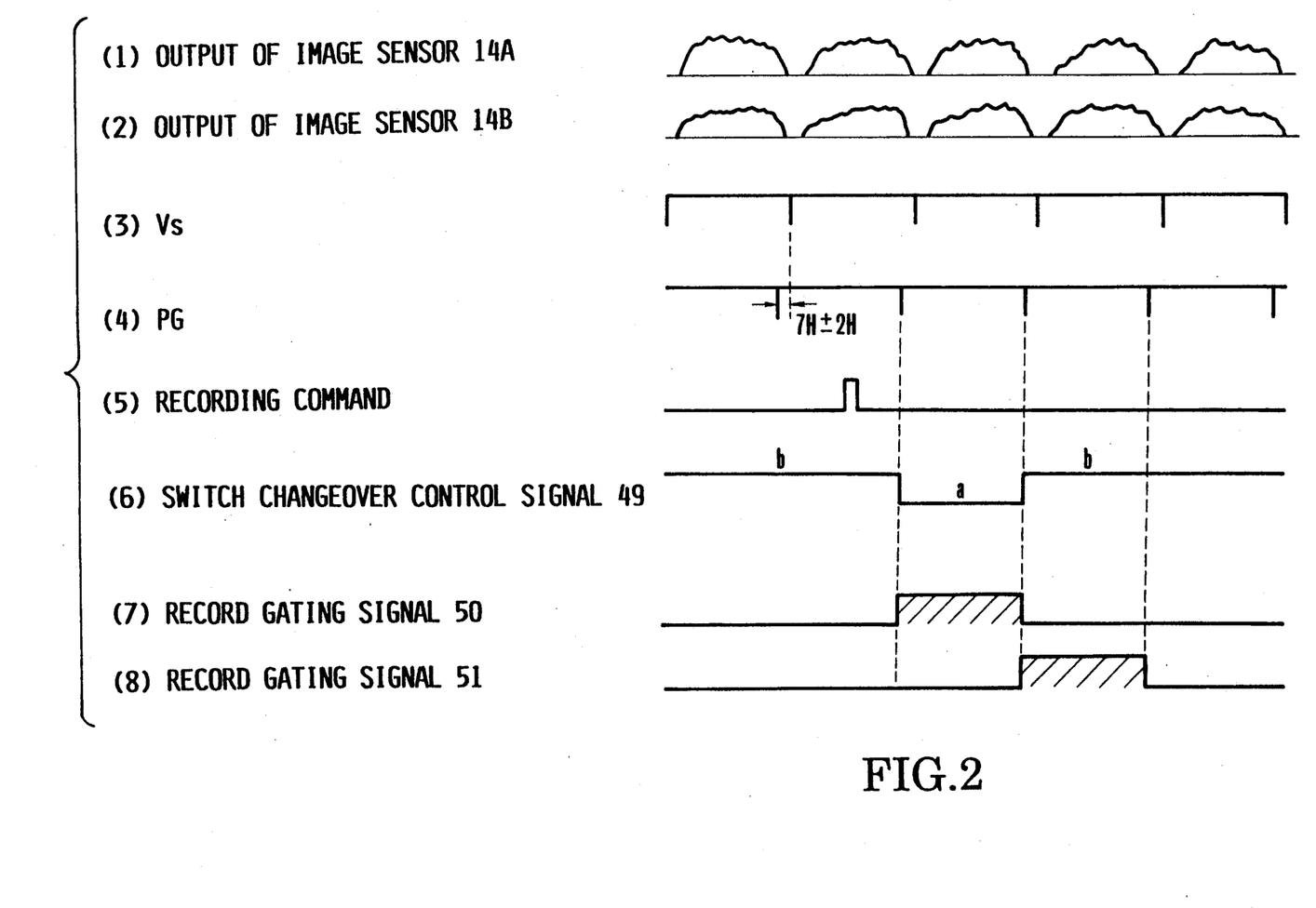
FIG. 2 is a timing chart for its operation.

FIG. 2 is a timing chart for the recording operation. The output of the image sensor 14A is shown on part (1) of FIG. 2; the output of the image sensor 14B on part (2); the vertical synchronizing signal Vs of 60 Hz (NTSC) output from the clock generating circuit 52 on part (3); and the PG pulse output from the PG detecting circuit 44 on part (4). This PG pulse indicates the phase of rotation of the magnetic sheet 34. The PG detecting coil 42 detects magnetism caused by the PG pin 40 and the PG detecting circuit 44 amplifies and shapes the output of the PG detecting coil 42. Thus, the PG pulse is formed. The servo circuit 46 controls the motor 38 in such a manner as to compare the phases of the vertical synchronizing signal Vs and the PG pulse with each other and adjust this phase difference to a predetermined value. Therefore, a certain phase relationship is sustained between the PG pulse and the vertical synchronizing signal Vs. For reference, with the use of the before-mentioned still video format, they are kept in a phase relationship that the PG pulse lies earlier than the vertical synchronizing signal by 7 H±2 H (where H represents the horizontal synchronizing period). By keeping the constant phase relationship, the record position of the signal can be kept constant in the recording track on the magnetic sheet 34.

After the predetermined phase relationship has been established in such a manner, when the system controller 48 receives a recording command signal (part (5) of FIG. 2) from an operation switch (not shown), the system controller 48, as shown on part (6) of FIG. 2, in response to the PG pulse of the next timing to the recording command signal, supplies the switch changeover control signal 49 to the switches 26A and 26B. Thus, the switches 26a and 26B are moved to their "a" positions. Also, as shown on part (7) of FIG. 2, in response to the PG pulse, the system controller 48 supplies the record gating signal 50 to the recording amplifiers 28A and 28B for the period of one field. By this, the video signals for the first field output from the first image sensor 14A and the second image sensor 14B are simultaneously recorded on the magnetic sheet 34 by the heads 32-1 and 32-3, respectively.

After recording for one field is completed, the system controller 48 moves the switches 26A and 26B to their "b" positions by the switch changeover control signal 49 (part (6) of FIG. 2). At the same time, the record gating signal 51 is supplied to the recording amplifiers 30A and 30B for one field period. By this, the video signals for the second field output from the first image sensor 14A and the second image sensor 14B are recorded by the heads 32-2 and 32-4, respectively, in another track on the magnetic sheet 34.

It should be noted in connection with the head driving during the recording that the interference by the cross talk between the adjacent two of the heads is limited to a minimum by driving a 2-head unit consisting of the heads 32-1 and 32-3 and another 2-head-unit consisting of the heads 32-2 and 32-4 alternately while driving the two heads in each pair at the same time, so that frame recording can be performed with good efficiency.

Figure 3:
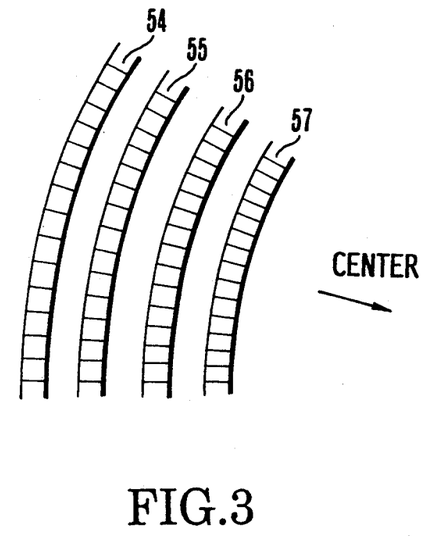
FIG. 3 is a fragmentary top view in enlarged scale of recording track patterns.

In such a manner, the output video signals for one frame of the first image sensor 14A and the output video signals for one frame of the second image sensor 14B are recorded on the magnetic sheet 34. FIG. 3 shows fragments of its recording track patterns. The first field signal of the first image sensor 14A lies in a track 54, its second field signal in another track 55, the first field signal of the second image sensor 14B in a track 56 and its second field signal in another track 57. In the case of the NTSC type, signals for 262.5 H are recorded in one track.

Figure 4:
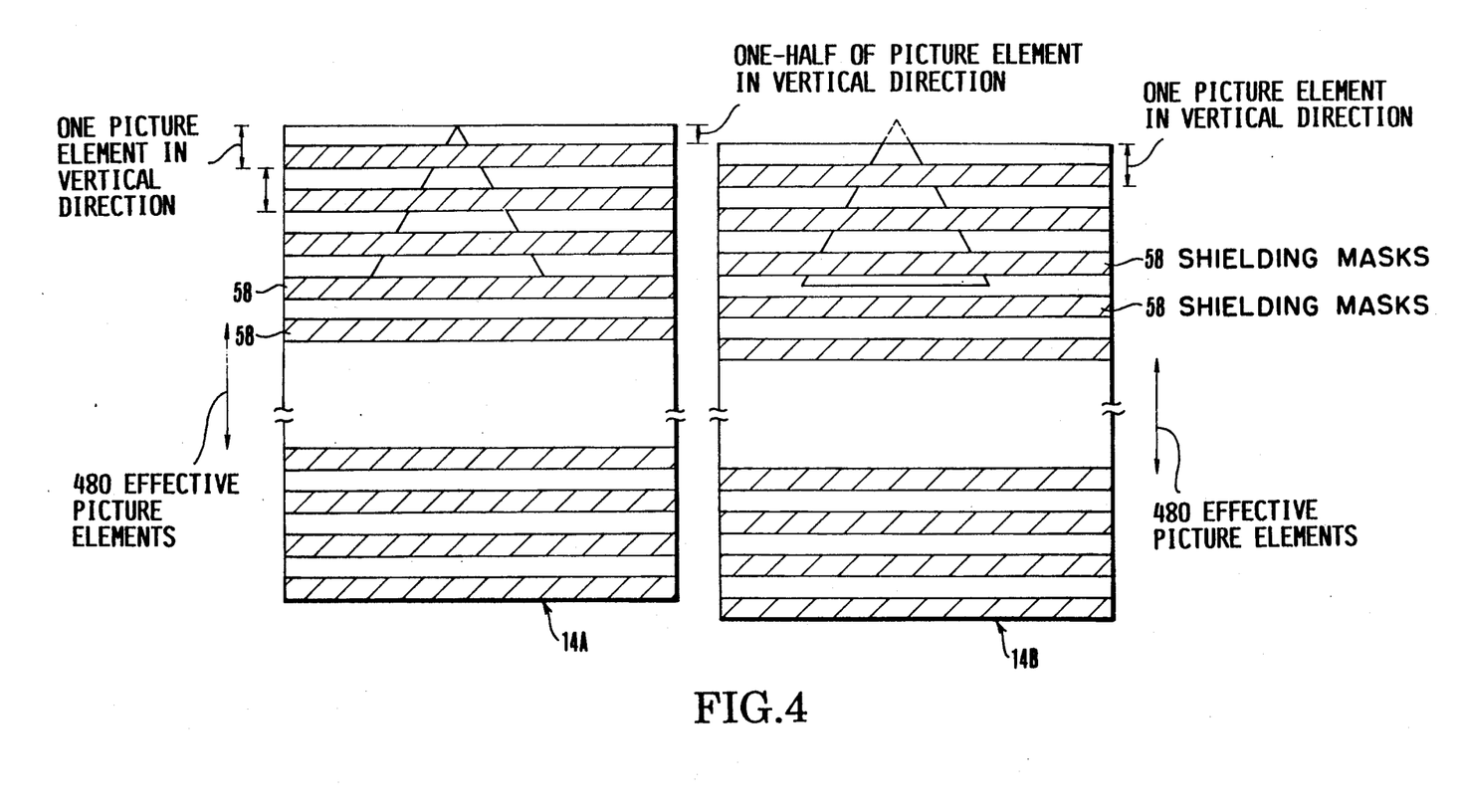
FIG. 4 is a front elevation view illustrating the relationship of the vertical positions of the image sensors 14A and 14B of FIG. 1.

Next, the optical relationship of the positions of the image sensors 14A and 14B is described. FIG. 4 in front view looking from the photographic lens 10 side schematically illustrates the image sensors 14A and 14B. As shown in FIG. 4, the image sensors 14A and 14B are arranged in offset relation by a distance equal to one-half of a vertical width of one picture element. In the horizontal direction, on the other hand, they are arranged in exactly the same positions relative to the photographic lens 10. And, an imaging plane of each of the image sensors 14A and 14B is covered by shielding masks 58 having a width equal to one-half of a picture element in the vertical direction with a vertical pitch equal to one picture element in the vertical direction. Accordingly, the 525-line frame picture of the image sensor 14A and the 525-line frame picture of the image sensor 14B are in complementary relation to each other. In total, therefore, $525 \times 2 = 1,050$ scanning lines are obtained. Incidentally, the picture elements of the image sensor 14A and the picture elements of the image sensor 14B are taken out of vertical alignment with each other by a pitch equal to one-half of a picture element.

Figure 5:
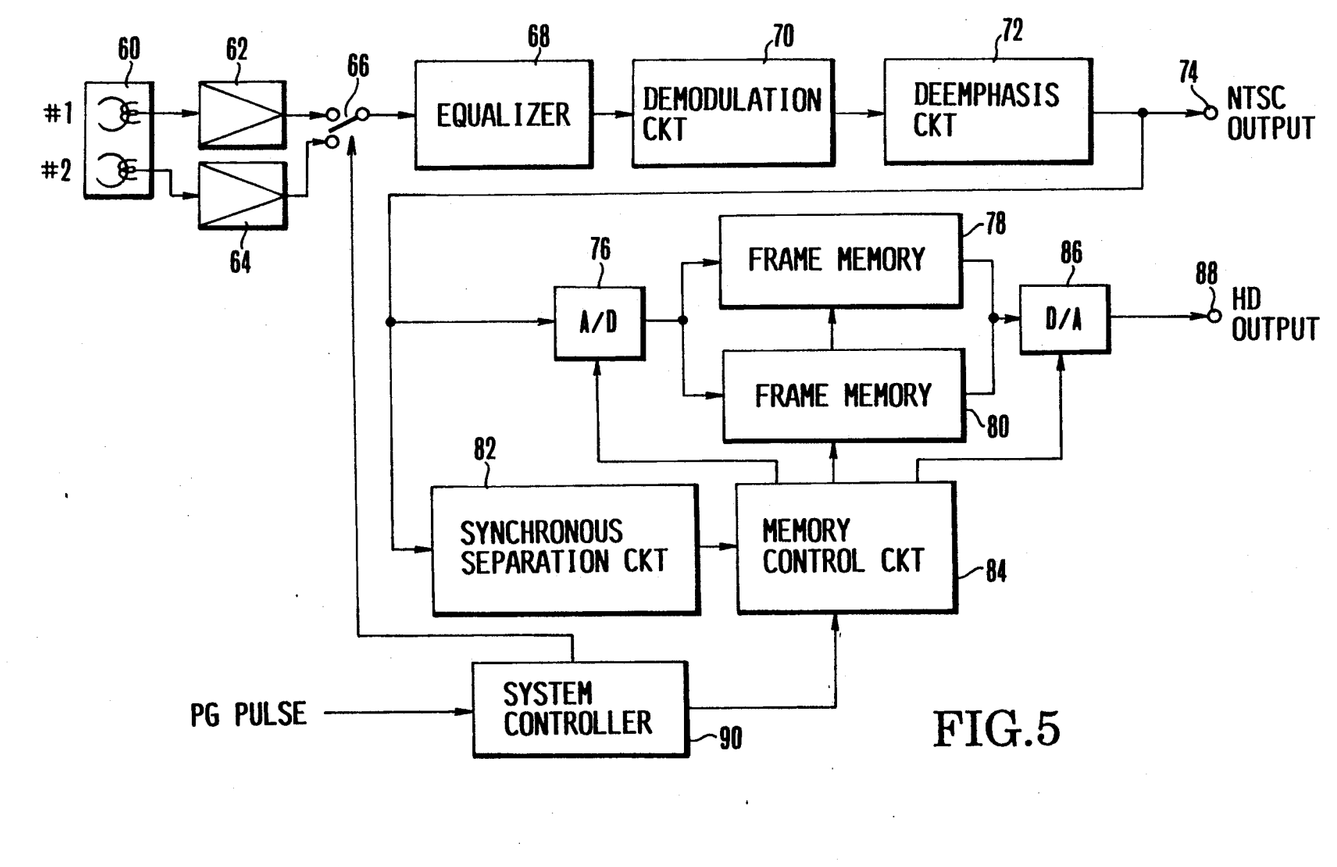
FIG. 5 is a block diagram of the construction of the reproducing circuit.

FIG. 5 in block diagram shows a circuit for reproducing the recorded signals from the magnetic sheet 34, comprising a 2-channel head 60, reproducing amplifiers 62 and 64, a head selection switch 66, a reproducing equalizer 68, an FM demodulation circuit 70, a deemphasis circuit 72, an output terminal 74 from which the reproduced monochrome NTSC signal is output, an A/D converter 76, frame memories 78 and 80, a synchronous separation circuit 82, a memory control circuit 84, a D/A converter 86, another output terminal from which the high-definition video signal is output, and a system controller 90.

At the time of reproduction, the magnetic sheet 34 is rotated at a predetermined speed similar to the time of recording, with the two heads of the 2-channel head 60 in contact on the adjacent two tracks, for example, the tracks 54 and 55, respectively. The reproduced signals by the head 60 are amplified by the pre-amplifiers 62 and 64 and then supplied to the switch 66. The system controller 90 responsive to the PG pulse by the PG pin of the center core of the magnetic sheet being reproduced, changes over between the two positions of the switch 66 by each field. By this way, the reproduced frame signal is supplied to the equalizer 68. The FM demodulation circuit 70 FM-demodulates the output of the equalizer 68, and the deemphasis circuit 72 performs deemphasis treatment on its demodulated signal. The output of the deemphasis circuit 72 is the NTSC signal. If an NTSC monitor device is connected to the output terminal 74, the reproduced NTSC frame picture is displayed on that monitor device.

Next, a case of obtaining the output of high-definition video signals is described. The output of the deemphasis circuit 72 is supplied to the A/D converter 76 and the synchronous separation circuit 82. The synchronous separation circuit 82 separates the composite synchronizing signal, which is then supplied to the memory control circuit 84. Responsive to this composite synchronizing signal, the memory control circuit 84 generates a sampling clock for the A/D converter 76 and a control signal (write-in clock, address signal, etc.) for the frame memory 78. The A/D converter 76 performs A/D conversion at that sampling clock, and its output data is first memorized in the frame memory 78. Thus, the signal for one frame picked up by the image sensor 14A is stored in the frame memory 78.

After this, the system controller 90, for the purpose of reproducing the frame picture picked up by the second image sensor 14B, moves the head 60 to the confronting position to the tracks 56 and 57 of FIG. 3. The reproduced frame signal by this is stored in the frame memory 80 under the control of the system controller 90 and the memory control circuit 84.

After the storing in the frame memories 78 and 80 is completed, the system controller 90 commands the memory control circuit 84, causing it to carry out reading at the high-definition rate with the stored signal in the frame memory 78 as the first field, and the stored signal in the frame memory 80 as the second field. The data read from the frame memories 78 and 80 is converted by the D/A converter 86 to an analog signal, which is then supplied to the output terminal 88.

While the recording and reproducing with the resolution of about 1,000 lines in the vertical direction can be realized by the recording apparatus of FIG. 1 and the reproducing apparatus of FIG. 5, these apparatus can also be used for the usual or 525-line NTSC photography. That is, in the usual mode (525-line NTSC), the half-mirror 12 of FIG. 1 is turned around its edge portion B as the axis of rotation in a direction of an arrow A, being retracted from the path of the object image bearing light beam so that the first image sensor 14A only is given the object image. By this, it becomes possible to carry out a frame recording similar to the usual NTSC monochrome still video camera. Also, in this case, because that fraction of the loss which is caused by the half-mirror 12 is removed, S/N is improved.

As is easily understandable from the foregoing, according to the first embodiment of the invention, despite the use of the conventional television type image sensing means, a signal of twice resolution in the vertical direction can be obtained. Because the conventional television type image sensing means suffices, a high-resolution camera can be realized at a low price. Also, the video signals for the conventional television system can be obtained. Thus, a camera of very high versatility has been realized.

Figure 6:
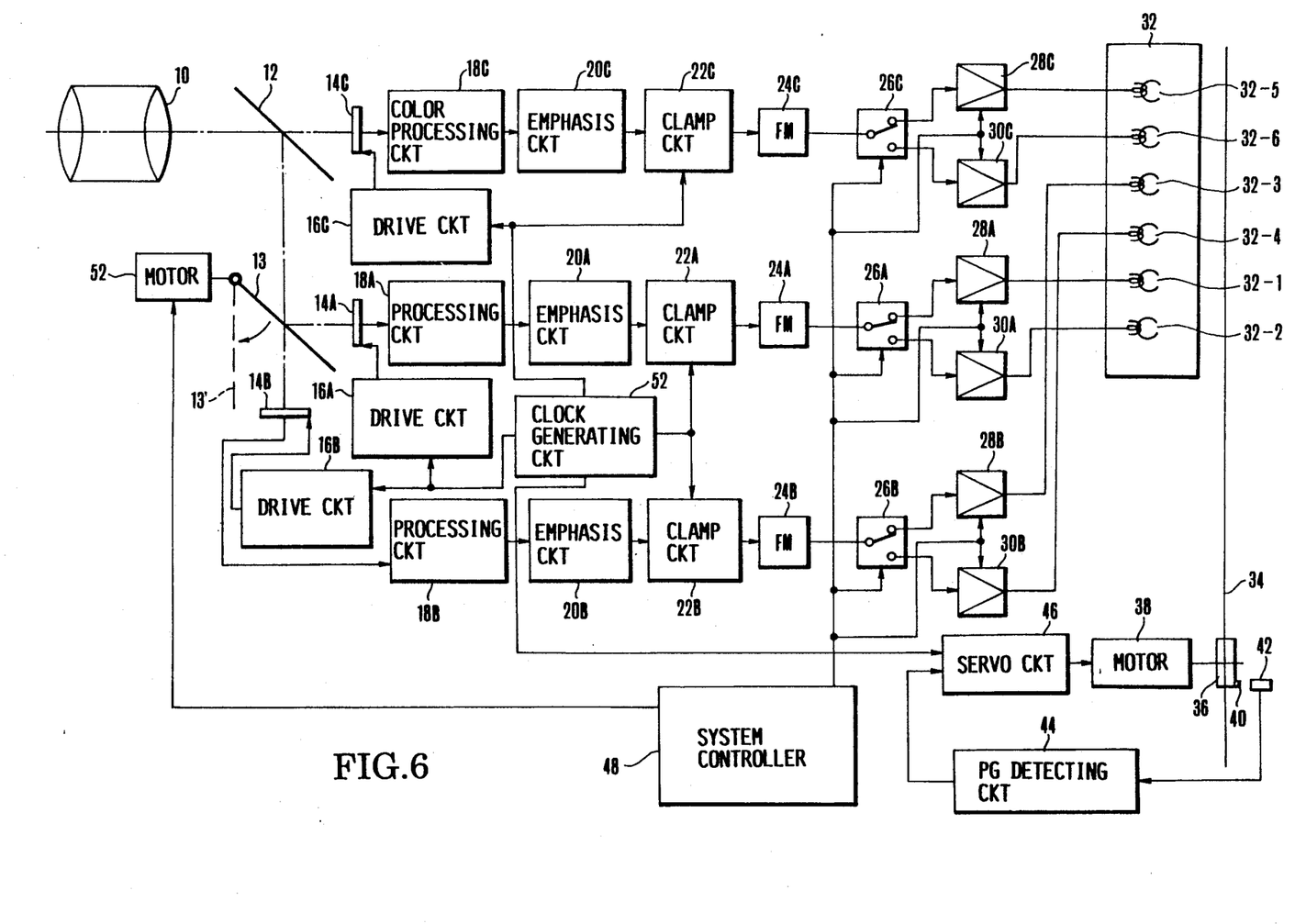
FIG. 6 is a block diagram of a second embodiment of the invention applied to the picture recording apparatus.

A second embodiment of the image sensing apparatus according to the invention is next described with reference to FIG. 6, where the same reference numerals have been employed to denote the similar parts to those shown in FIG. 1 to FIG. 5. A second half-mirror 13 is moved between an illustrated position and another position indicated at 13' by an electric motor 52. A color image sensor 14C of about 240 lines with a color separation filter arranged in front thereof is driven by a drive circuit 16C. The three image sensors 14A, 14B and 14C are arranged on respective planes which are made optically equivalent to each other by the half-mirrors 12 and 13. In this embodiment, while for the image sensors 14B and 14C there are provided respective signal processing channels for recording of the same structure, for the image sensor 14C there is a signal processing channel for color signal, comprising a color signal processing circuit 18C, an emphasis circuit 20C, a clamp circuit 22C, an FM modulation circuit 24C, a selection switch 26C for recording-magnetic heads and recording amplifiers 28C and 30C consisting of gate amplifiers. A multi-channel head 32 contains six magnetic heads 32-1, 32-2, 32-3, 32-4, 32-5 and 32-6.

Next, the operation of the color signal processing system is described. The same object image as those on the image sensors 14A and 14B is caused to enter the image sensor 14C by the half-mirror 12. The signal output from the image sensor 14C in response to the drive signal output from the drive circuit 16C is converted to a chrominance signal by the color signal processing circuit 18C. This chrominance signal is then subjected to known treatments similar to those for the luminance signal successively in the emphasis circuit 20C, the clamp circuit 22C and the FM modulation circuit 24C.

Movement of the switches 26A, 26B and 26C is controlled by the system controller 48. The switches 26A and 26B are changed over between two positions by each field. By this way, the frame picture signals of the image sensors 14A and 14B are magnetically recorded on the magnetic sheet 34. The operation of the switch 26C, too, is controlled in such a manner that when magnetically recording the output of the image sensor 14A, it is connected to the recording amplifier 28C side, while when magnetically recording the output of the image sensor 14B, it is connected to the recording amplifier 30C side. The recording amplifiers 28A, 30A, 28B, 30B, 28C and 30C are controlled to their operative positions by record gating signals output from the system controller 48 so that each applies a recording current to the corresponding head of the multichannel head 32 for a predetermined time.

Thus, the recording of the outputs for the luminance signal of the image sensors 14A and 14B in such a manner, due to the complementarity of the optical arrangements of the image sensors 14A and 14B shown in FIG. 2, enables realization of twice as high a vertical resolution as the image sensor 14A or 14B is used alone. Since the color signal does not much affect the vertical resolution, the image sensor 14C having as large a number of lines as in the conventional one (for example, about 240 lines) is sufficient. Incidentally, by each field, a group of the heads 32-1, 32-3 and 32-5 and another group of the heads 32-2, 32-4 and 32-6 are moved alternately.

Also, with the half-mirror 13 retracted to the position shown by a dashed line 13' by the motor 52, because, at this time, a 2-plate type color image sensing apparatus is formed with the image sensors 14B and 14C, the output signal suited to the conventional television system can be obtained. Further, twice as high a quantity of light enters the image sensor 14B. Therefore, a higher value of S/N can be expected.

It will be appreciated from the foregoing that according to the second embodiment of the invention, despite the use of the conventional television type image sensing means, a signal of twice increased resolution in the vertical direction can be obtained. Because the conventional television type image sensing means suffices, a high-definition camera can be realized at a cheap price. Also, since the video signals suited to the conventional color television system, too, can be produced, the camera can be used selectively for high definition and convention, thus being very useful in actual practice.

What is claimed is:

1. An image sensing apparatus comprising a photographic optical system, splitting means for splitting an optical image formed by said photographic optical system into two channels to form two optical images, and first and second image sensing means for photoelectrically converting the two optical images formed by said splitting means into electrical signals, wherein said first image sensing means and said second image sensing means are arranged on optically equivalent planes in offset relation by a pitch equal to one-half of a picture element in the vertical direction and, wherein horizontally extending shielding masks having a width equal to about one-half of a picture element in the vertical direction with a pitch equal to one picture element in the vertical direction are arranged on an imaging plane of each of said first and second image sensing means.

2. An apparatus according to claim 1, wherein said splitting means includes a half-mirror.

3. An apparatus according to claim 1, wherein said first, second and third image sensing means include solid-state image sensors.

4. An apparatus according to claim 1, further comprising drive means for synchronously driving said first, second and third image sensing means.

5. An apparatus according to claim 1, further comprising means for rendering said splitting means inoperative.

6. An apparatus according to claim 1, further comprising color image sensing means positioned to receive an optical image formed by said photographic optical system and having a lower resolution than that of said first and second image sensing means.

7. An image sensing apparatus comprising a photographic optical system, splitting means for splitting an optical image formed by said photographic optical system into three channels to form three optical images, and first and second image sensing means for a luminance signal and third image sensing means for a chrominance signal for photoelectrically converting the three optical images formed by said splitting means into electrical signals, wherein said first image sensing means and said second image sensing means are arranged on optically equivalent planes in offset relation by a pitch equal to one-half of a picture element in the vertical direction, and wherein horizontally extending shielding masks having a width equal to about one-half of a picture element in the vertical direction with a pitch equal to one picture element in the vertical direction are arranged on an imaging plane of each of said first and second image sensing mans.

8. An apparatus according to claim 7, wherein said splitting means include a half-mirror.

9. An apparatus according to claim 7, wherein said first, second and third image sensing means include solid-state image sensors.

10. An apparatus according to claim 7, further comprising drive means for synchronously driving said first, second and third image sensing means.

11. An apparatus according to claim 7, wherein said splitting means includes two half-mirrors.

12. An apparatus according to claim 11, further comprising means for selectively rendering at least one of said two half-mirrors inoperative.

13. An apparatus according to claim 7, wherein said third image sensing means has a lower resolution than said first and second image sensing means have.

* * * * *